July 28, 1936. A. A. BYERLEIN Re. 20,042

DRAWING PRESS

Original Filed Dec. 21, 1927 7 Sheets-Sheet 1

INVENTOR.
Arthur A. Byerlein
BY Maréchal and Noe
ATTORNEYS.

July 28, 1936. A. A. BYERLEIN Re. 20,042

DRAWING PRESS

Original Filed Dec. 21, 1927 7 Sheets-Sheet 2

INVENTOR.
Arthur A. Byerlein
BY Marichal and Hoe
ATTORNEYS.

July 28, 1936. A. A. BYERLEIN Re. 20,042

DRAWING PRESS

Original Filed Dec. 21, 1927 7 Sheets-Sheet 3

INVENTOR.
Arthur A. Byerlein
BY Maréchal and Noe
ATTORNEYS.

July 28, 1936. A. A. BYERLEIN Re. 20,042

DRAWING PRESS

Original Filed Dec. 21, 1927 7 Sheets-Sheet 4

INVENTOR.
Arthur A. Byerlein
BY Maréchal and Noe
ATTORNEYS.

July 28, 1936. A. A. BYERLEIN Re. 20,042

DRAWING PRESS

Original Filed Dec. 21, 1927 7 Sheets-Sheet 5

INVENTOR.
Arthur A Byerlein
BY Maréchal and Noe
ATTORNEYS.

DRAWING PRESS

Original Filed Dec. 21, 1927 7 Sheets-Sheet 6

INVENTOR.
Arthur A Byerlein
BY Maréchal and Noe
ATTORNEYS.

DRAWING PRESS
Original Filed Dec. 21, 1927 7 Sheets-Sheet 7
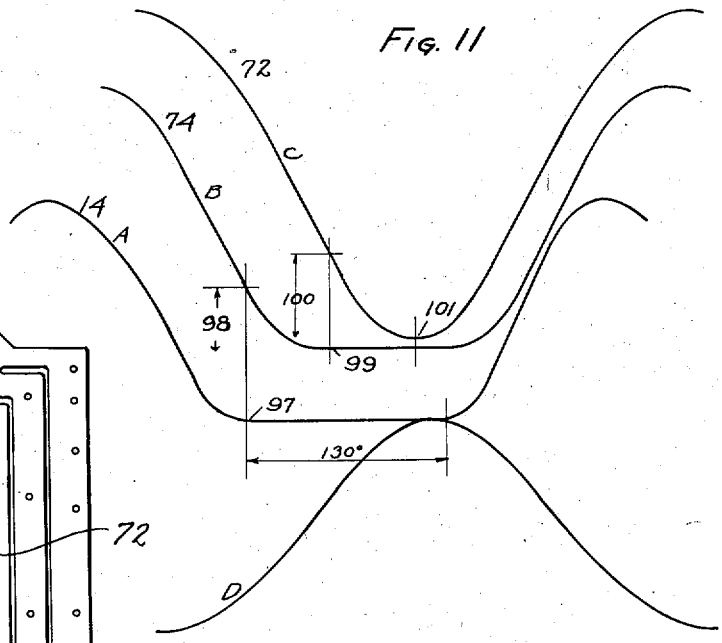
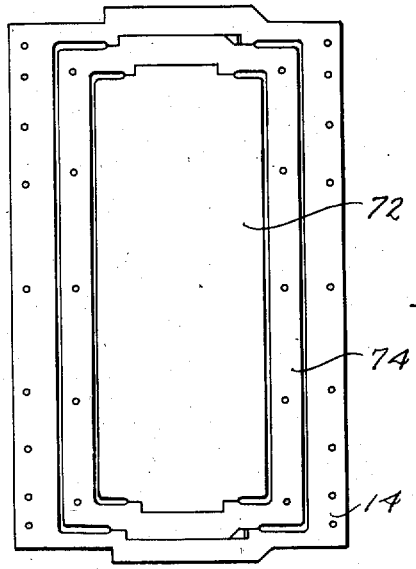
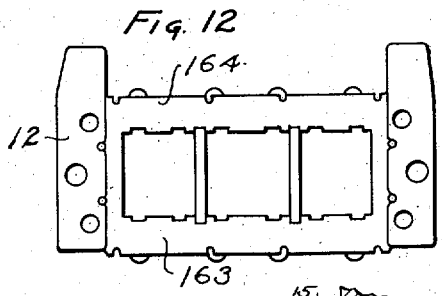
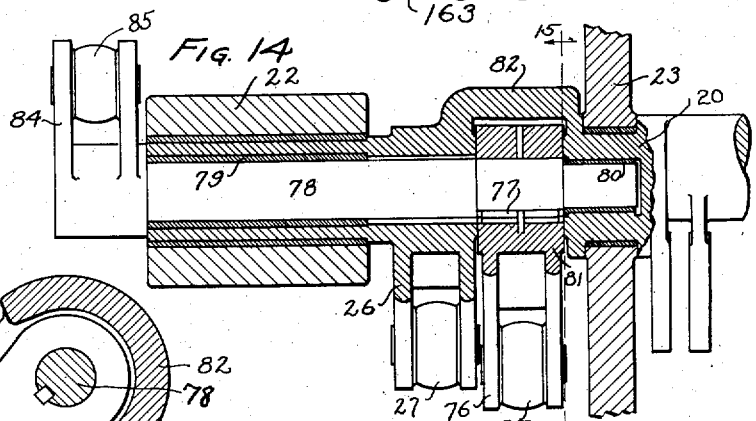
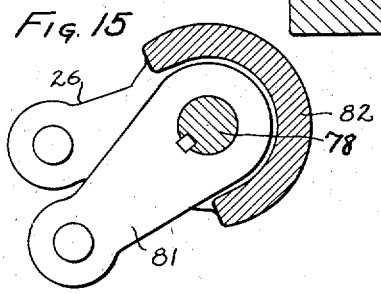
INVENTOR
Arthur A. Byerlein
BY
Marechal and Noe
ATTORNEY Reissued July 28, 1936 Re. 20,042

UNITED STATES PATENT OFFICE 20,042

DRAWING PRESS

Arthur A. Byerlein, Detroit, Mich., assignor, by mesne assignments, to General Machinery Corporation, Hamilton, Ohio, a corporation of Delaware Original No. 1,768,503, dated June 24, 1930, Serial No. 241,547, December 21, 1927. Application for reissue June 10, 1936, Serial No. 84,581

34 Claims. (Cl. 113—38)

This invention relates to presses and particularly to that type of press used in drawing metal.

One of the principal objects of the present invention is to provide a press of this character having a plurality of blank holders, one of which is operable as a drawing member, both blank holders being operated by mechanism which is located at the same side of the press-bed.

Another object of the invention is the provision of a drawing press having three slide members mounted one within the other, all movable toward the work or blank in the same direction, at least one of the slide members being operable with a dwell in its movement so as to serve as a blank holder.

A further object of the invention is the provision of a press having two plungers operable toward the work or blank from opposite sides thereof, rotatable operating shafts being provided at opposite sides of the press-bed for driving the two plungers.

Still another object is the provision of a press having three relatively movable slide members operably connected to a common crank-shaft, with the operating connections all at the same side of the press-bed.

Other objects and advantages of the invention will be apparent from the following description and the accompanying drawings in which—

Fig. 11 is a diagrammatic showing of the travel of the various slide members of the press;

Fig. 12 is a plan view of the bed of the press;

Fig. 13 is a bottom plan view of the three slide members of the press;

Fig. 14 is a horizontal section on the line 14—14 of Fig. 1 through the end of one of the rock-shafts of the press; and Fig. 15 is a section on the line 15—15 of Fig. 14.

Figure 1:
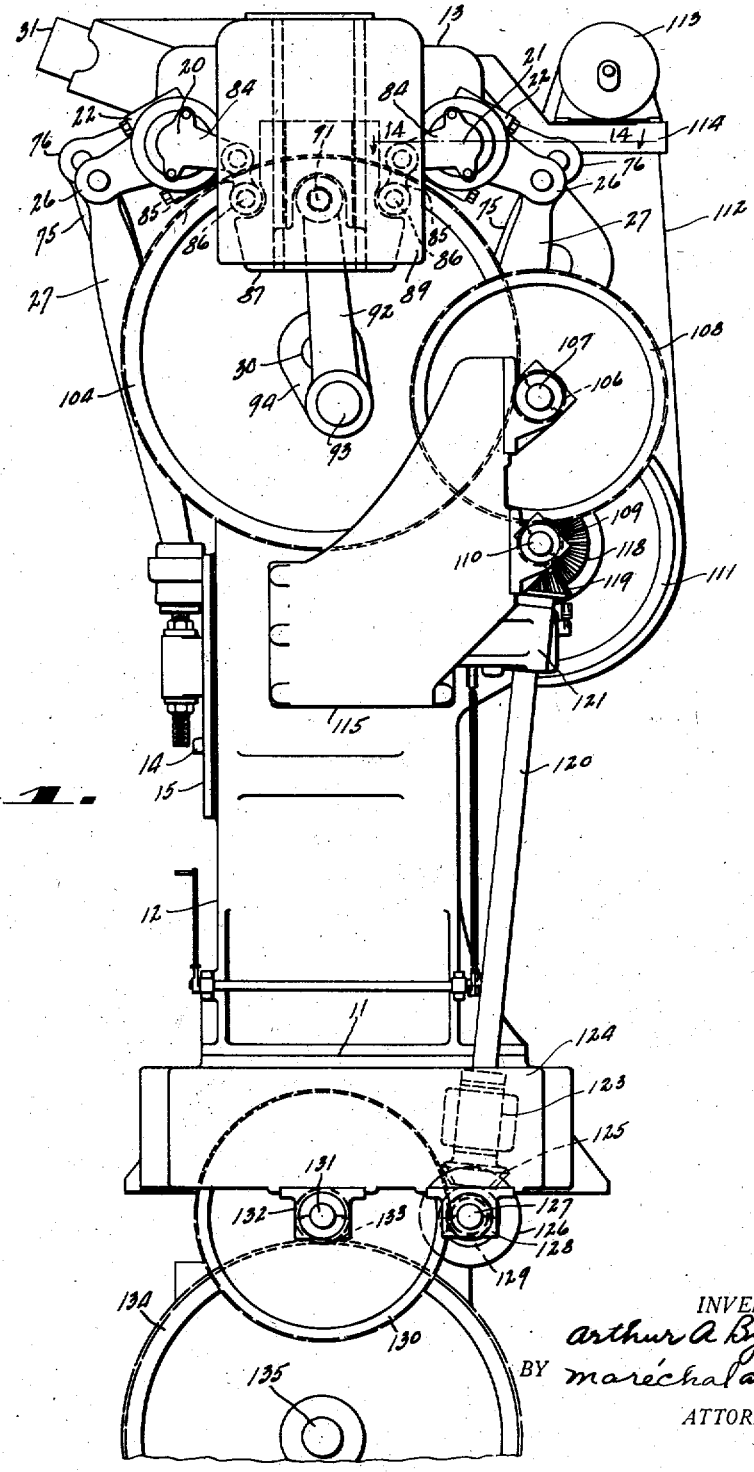
Fig. 1 is a side elevation of a drawing press embodying the present invention.
Figure 2:
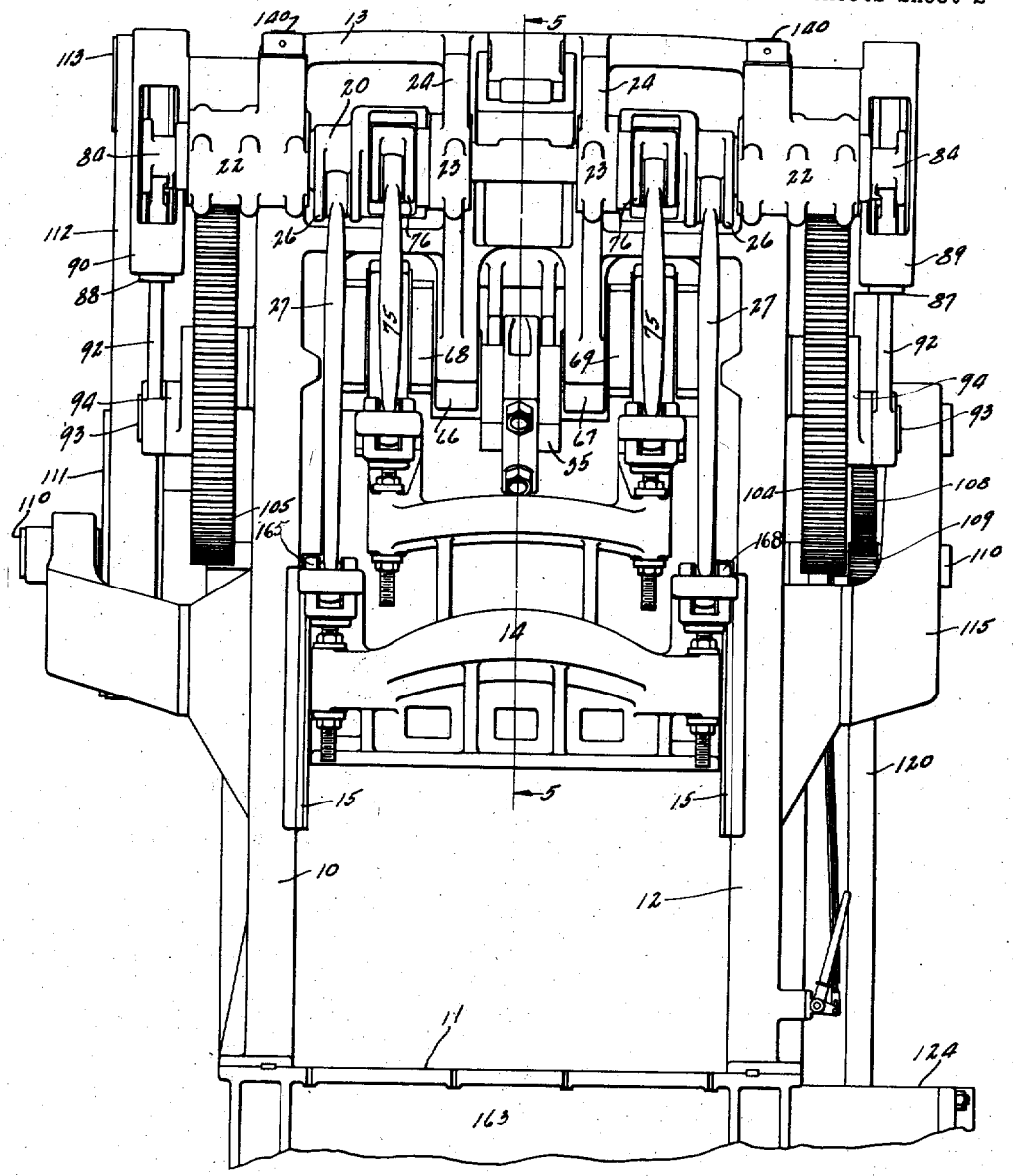
Fig. 2 is a front elevation thereof showing the portion of the press above the press-bed.

Referring to the figures more particularly by reference numerals 10 designates the frame of the press which comprises a bed 11, spaced apart uprights or side frames 12 carrying the actuating mechanism and guiding the outer blank holder for vertical reciprocatory movement, and an arch member 13 which interconnects the two side frames. The outside blank holder 14 is guided upon guides 15 upon the side frames 12 of the press.

Means for reciprocating the outside blank holder 14 in its guides 15 comprises a toggle mechanism consisting of front and rear toggle rock-shafts 20 and 21 extending transversely of the press and journaled in bearings 22 at the ends of the rock-shafts and additional bearings 23 provided in the two depending walls 24 which form a part of the arch member 13. The rock-shafts 20 and 21 are provided with integral arms 26 between the bearings 22 and 23 near the outer ends of the rock-shafts, the outer ends of these arms being connected to the upper ends of links 27, the lower ends of these links being pivotally connected to ears 168 on the outside blank holder 14 adjacent the four corners thereof. The rock-shafts together with the arms 26 and the links 27 constitute toggles for reciprocating the blank holder, it being apparent that rotation of the rock-shafts 20 and 21 in opposite directions results in either raising or lowering the blank holder 14 and since all the corresponding parts move simultaneously and through equal distances the blank holder is raised or lowered, without tilting or binding, and an even pressure is obtained upon the work or blank when this blank holder is in the lowered position.

Figure 5:
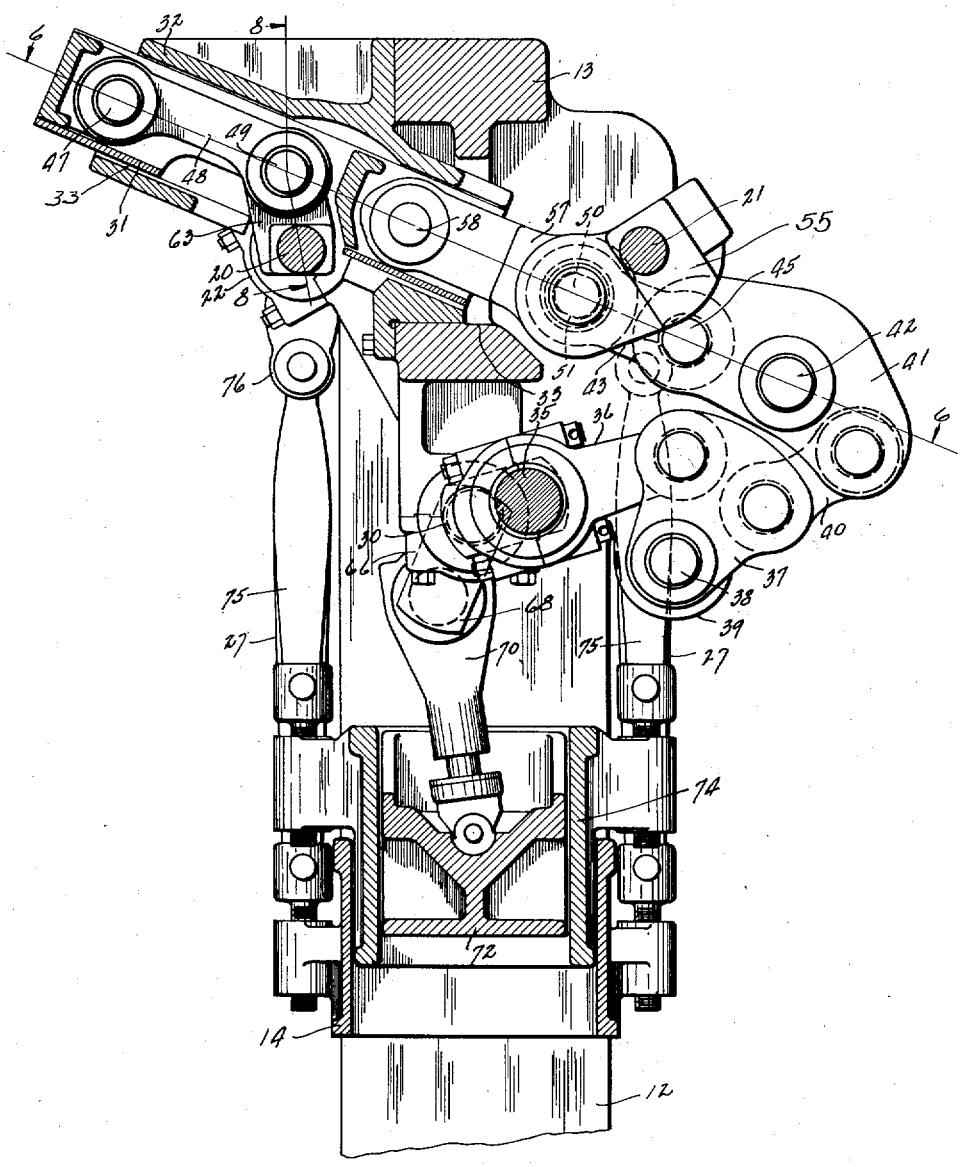
Fig. 5 is a central section on the line 5—5 of Fig. 2 showing the actuating mechanism for the outside blank holder with the latter in its lowered position.
Figure 6:
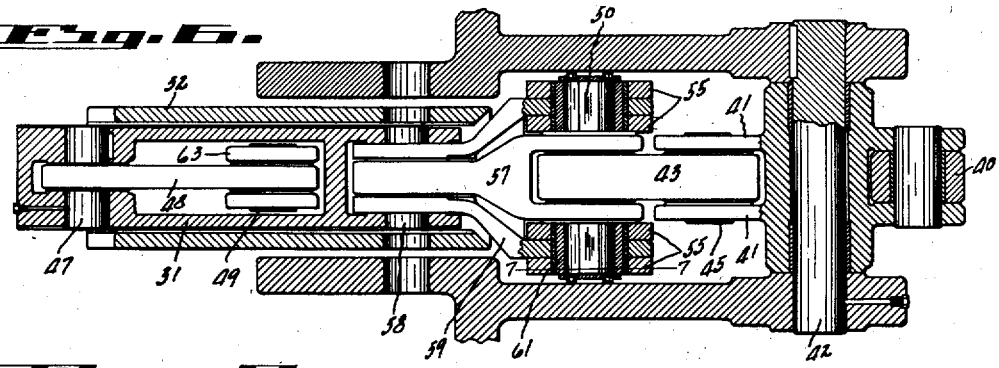
Fig. 6 is a section on the line 6—6 of Fig. 5.
Figure 8:
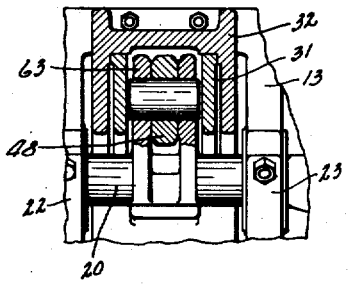
Fig. 8 is a section on the line 8—8 of Fig. 5.
Figure 7:
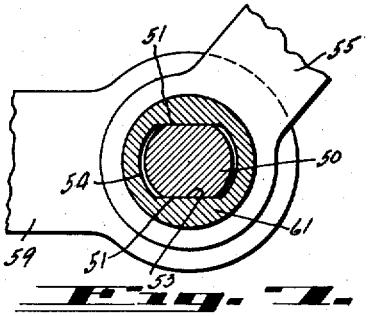
Fig. 7 is a section on the line 7—7 of Fig. 6.

The rock-shafts 20 and 21 are actuated from a rotatable actuating shaft or crank-shaft 30 journaled in the side frames and extending transversely of the press and centrally positioned between the rock-shafts and situated in the central vertical plane of the press. Such actuating mechanism includes as one of its principal elements a slide-actuating member 31 which is connected with the rock-shafts 20 and 21 to actuate the same, and which is itself actuated from the crank-shaft 30. The slide-actuating member 31 is supported between the rock-shafts 20 and 21 within a slide housing 32 which guides the slide-actuating member for reciprocatory movement along an obliquely disposed line extending from front to rear of the press, the line of movement passing above the front rock-shaft 20 and below the rear rock-shaft 21, the normal distances between the line of movement and the two rock-shafts being equal. This arrangement is best illustrated in Fig. 5. The slide housing 32 is an elongated tubular member preferably of rectangular cross-section and is rigidly secured to the arch member 13 of the press which is cast with an obliquely disposed opening 33 in the mid plane of the press to receive the slide housing 32.

Referring particularly to Figs. 5 to 10, the crank-shaft 30 is provided with a crank 35, preferably in the mid plane of the press, which crank is connected by a connecting rod 36 with a segmental shaped rock lever 37 pivotally mounted upon pin 38 which is fixed in a lug 39 forming a part of the arch of the press frame. Rocking lever 37 is connected by a link 40 to a second rocking lever 41 which is mounted on pin 42 which, like pin 38, is immovably fixed in the part 39 of the arch. The rocking lever 41 is pivotally connected at its other end with a link 43 which is connected to the pin 45 of the bifurcated rocking lever 41. The other end of link 43 is rotatably connected to the center of a pin 50 which in turn is keyed to a bifurcated link 57. Link 57 connects through link-pin 58 with the rear end of the slide-actuating member 31.

Figure 10:
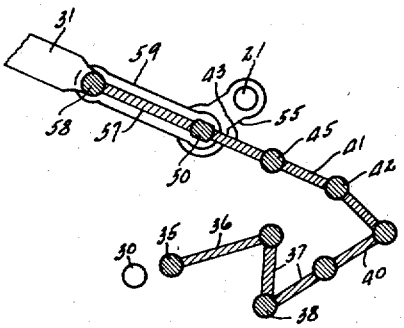
Figs. 9 and 10 are diagrammatic views of certain linkages.
Figure 9:
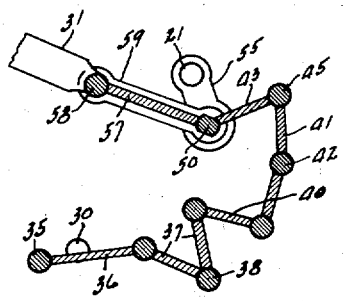

The motion is transmitted from the slide-actuating member 31 to the rear toggle rock-shaft 21 through the following connections. The pin 58, which is fixed in the member 31, carries the ends of two links 59 which are bent so as to enclose the outer end portions of the pin 50. Instead of engaging the pin 50 directly, however, the links 59 are connected through bushings 61 which are rotatable in the forked arms 55 of the toggle rock-shaft 21. The ends of the link-pin 50 are provided with a pair of flat parallel surfaces 51 adapted to be received between cooperating parallel flat surfaces 53 upon the interior of bushings 61. The bushings are constructed to have a close sliding fit with the surfaces of the link-pin 50 and some little clearance space is provided at 54 to permit some relative motion of the pin and bushing at right angles to the axis of the pin. Since the pin is keyed to the link 57 with the flat surfaces 51 parallel to the longitudinal axis of that link, it is apparent that the bushings are constrained to movement upon pin 50 in a direction parallel with the longitudinal axis of the link 57. The rear end of the slide-actuating member 31 is thus connected with the toggle rock-shaft 21 through links 59, bushings 61, and arms 55, and because of the sliding connection between the pin 50 and bushings 61 there is a certain independence of movement between the main linkage which drives the slide-actuating member 31, and the linkage by which the slide-actuating member is connected to the rock-shaft 21. The connections to the actuating-slide member 31 and to the rock-shaft 21 are shown by Figs. 9 and 10 diagrammatically. In Fig. 10, which corresponds to the position of the parts shown in Fig. 5, the linkages are shown for a down position of the blank holder 14, and in Fig. 9 corresponding to a raised position of this blank holder. In these diagrammatic views, the main linkage for actuating the slide-actuating member 31 from the crank-shaft 30 is shown by the sectioned parts, and the linkage for actuating the rock-shaft 21 from the slide-actuating member is shown in outline. It is evident from these figures and from Figs. 6, 7 and 8 that the link-pin 50 is free to slide in the bushing 61 and to take a position therein depending upon the running clearance which may vary from time to time with the varying stresses and wear of the various parts.

The forward end of the slide-actuating member 31 is connected with the front rock-shaft 20 to drive the latter by a mechanism which consists of a link-pin 47 carried by the slide-actuating member and a link 48 pivoted thereon and pivotally connected at its other end with link-pin 49 carried upon the outer end of the forked arm 63 extending from and rigid with the front rock-shaft 20.

The linkage between the slide-actuating member 31 and each of the toggle rock-shafts 20 and 21 is such that the latter are actuated through equal angular distances thereby effecting parallel raising and lowering movement of the blank holder 14 through its operation, and securing even pressure of the blank holder upon the work. The power is transmitted through the toggle connections productive of a suspended dwell in the movements of the slide-actuating member 31 from the crank-shaft 30, and the power divides equally at the slide-actuating member and is transmitted through the two equal systems of transmission to the two toggle rock-shafts 20 and 21 which are thus actuated with a considerable dwell in their movements. The power is then transmitted from the two rock-shafts to opposite sides of the blank holder 14 and the blank holder is thus caused to reciprocate with a dwell of, say, 130°, as shown by curve A of Fig. 11. The power transmission for actuating the blank holder 14 is symmetrical with respect to the center of the press and from the center of the crank-shaft, and objectionable vibrations and unbalanced strains on the press parts are thus obviated.

The crank-shaft 30, as previously mentioned is mounted in bearings in the side frame members 12 and is also rotatably mounted in auxiliary bearings 66 and 67 in the walls 24. Between the two bearings 66 and 67 and the bearings in the frame portions 12 and equidistantly spaced from the center of the crank-shaft 30 are crank-arms 68 and 69 which are connected at their ends to two connecting rods 70, which are pivoted at their lower ends to the central portions of an inner slide member or plunger 72, the connecting rods being provided with the usual length-adjusting devices customarily employed in plunger connections. This plunger 72 is guided for vertical reciprocatory movement within an intermediate die slide member 74 which in turn is guided within the outside blank holder 14, as shown in Fig. 13. The intermediate slide member 74, which is operable as a blank holder and also as a drawing die slide, is connected at its four corners to links 75 the upper ends of which are pivotally connected to arms 76 which as shown are positioned closer to the center of the frame than the toggle links 27, by which the outside blank holder is operated. The arms 76 together with the links 75 form toggles, the arms 76 being fixed to stub rock-shafts 78. The rock-shafts 78 are journaled freely in the outer end of the toggle rock-shafts 20 and 21. As shown more clearly in Fig. 14 the toggle rock-shafts 20 and 21 are hollow at their ends so as to rotatably mount the stub-shafts 78 concentrically therewith. The hub portion 81 of each toggle arm 76 is received in a socket portion 82 provided on the outer portion of each toggle rock-shaft 20, 21, and the short rock-shafts 78 are thus prevented from moving endwise within the main toggle rock-shafts. The socket portions 82 as shown in Fig. 15 extend the greater portion of the way around the main rock-shafts 20 and 21, but one side of the socket 82 is open to permit relative rotational movement of the toggle arm 81 and the transmission of power from the rock-shaft 78 to the toggle connection to the intermediate slide member 74. Although both the toggle rock-shafts 20, 21 and the short rock-shafts 78 are rocked back and forth through a considerable angle, nevertheless, as both the main toggle rock-shafts 20, 21 and the additional short shafts 78 operate in the same direction at the same time through at least part of their movement in moving both the intermediate slide member 74 and the outside blank holder 14 downwardly or upwardly, the socket members 82 may extend throughout a major portion of the circumferential extent of the main rock-shafts 20, 21. At the outer end of each short rock-shaft 78 is an arm 84 which is pivotally connected to a link 85 which in turn is pivoted on pin 86 provided in a slide 87 provided at one side of the press, a corresponding slide 88 being provided at the opposite side of the press. The two slides 87 and 88 are vertically guided for reciprocatory movement in the slide guides 89 and 90 located at the upper side portions of the press and in the middle plane of the press in a forward and rearward direction. Each of these slides is pivotally connected by means of a pin 91 to a connecting rod 92 which is pivoted at its lower end on pin 93 provided at the end of a crank-arm 94 on the main crank-shaft 30 at the outer end thereof, it being understood that the power transmissions at both ends of the crank-shaft 30 to the two slides 87 and 88 are similar in their construction and symmetrically arranged on the press. The four short stub-shafts 78 thus reciprocate the intermediate slide member 74 with a considerable dwell in its movement due to the toggle connections between the short shafts 78 and the slide 74 and also due to the connections between the arm 84 and the crank-shaft.

The dwell in the movement of the intermediate slide member 74, as shown in Fig. 11 commences after the start of the dwell in the outer blank holder 14, the dwell of the intermediate slide member 74 being indicated by the curve B in the figure referred to. The plunger or inner slide member 72 has a motion which is indicated by the curve C. From Fig. 11 it is apparent that in the operation of the machine, the outside blank holder 14 first moves downwardly and then dwells in its movement. At the start of dwell in the movement of the outside blank holder, indicated by reference numeral 97 of curve A, the intermediate slide member 74 continues to move downwardly and completes its travel to its down position through the space 98 during which operation the die carried by this intermediate slide member operates as a drawing die to thus complete a first drawing operation on the metal before this intermediate slide member pauses at the point 99 in its downward movement and dwells. At the start of dwell of the intermediate slide member 74 the plunger 72 is moving downwardly and the plunger completes its movement through the space 100 and punches or draws the metal or blank while moving through this distance. During the effective operation of the plunger the intermediate slide member may serve as a blank holder, as it remains in engagement with the work and does not move upwardly to release the work until after the plunger has started to move away from the work, this point being indicated at 101 on curve C. After the plunger die has started to move away from the work the inner slide member and the outside blank holder reach the ends of their dwells and also are disengaged from the work. By reason of a construction such as this large stampings may be made in a single complete operation to provide an opening or a double draw in the metal, without necessitating the removal of the blank after one operation and again positioning the stamped metal in a second press to complete a second drawing or stamping operation on the partially formed work.

The transmission of power from the crank-shaft 30 to the plunger, the intermediate slide member 74 and the outer slide member 14 is symmetrical with respect to the center of the crank-shaft. The power is preferably supplied to the crank-shaft by means of two gears 104 and 105 which are fixed to the crank-shaft 30 adjacent its ends and just inside of the crank-arms 94. The two gears 104 and 105 are driven through pinions 106, one provided at each end of a transverse drive-shaft 107 which is in turn fixed to a driving gear 108. Gear 108 meshes with a pinion 109 fixed on shaft 110 extending across the press which also carries a wheel 111. This wheel 111 is driven by a belt 112 operated by means of a motor 113 provided on a bracket 114 which is fastened rigidly in place to an upper portion of the press. The bearings for the shafts 107 and 110 are provided in a bracket 115 which is attached rigidly in place to one side of the press frame.

The power-transmitting shaft 110 in addition to carrying the drive pinion 109 and wheel 111 is also rigidly attached to and drives a beveled drive-gear 118. Engaging the bevel gear 118 is a driven bevel gear 119 provided at the upper end of an upwardly extending shaft 120 at the rear side portion of the press. The shaft 120 is mounted at its upper end in a bearing 121 which is fixed to the press frame. The lower end of the shaft 120 is mounted in a bearing 123 provided in a box or case 124 at one side of the press near the bed. Rigidly connected to the lower end of the shaft 120 is a beveled gear 125 which engages with a beveled gear 126 carried by shaft 127 journaled for rotation in bearings 128 provided at the rear of the press as shown. This shaft 127 is also provided with a drive spur-gear or pinion 129 which engages spur-gear 130 fixed on the transverse shaft 131 journaled at its ends in bearings 132. Shaft 131 carries a pinion 133 which gears with the large spur-gear 134 provided at one side of the press on a main lower crank-shaft 135 which is journaled in bearings 136 and auxiliary bearings 137 in a bottom housing 138, which is positioned below and fixed to the press-bed 11 by removable tie rods 139 which are extensions of the main top tie rods 140, the bottom housing being spaced from the bed by a spacing portion 141. The crank-shaft 135 is located some distance below the press bed and centrally below the crank-shaft 30 at the upper end of the press. Between the bearings on each side of the crank-shaft the latter is provided with crank-arms 147 pivotally connected to connecting rods 142 which in turn are pivotally connected by pins 143 to a bottom slide member or plunger 144. The connecting rods 142 are formed of telescopic sections 145 and 146 so that their lengths may be adjusted to adjust the limits of movement of the bottom plunger 144, such an arrangement being similar to the length adjusting connection by means of which the upper plunger 72 is operably connected to the crank shaft 30.

Figure 3:
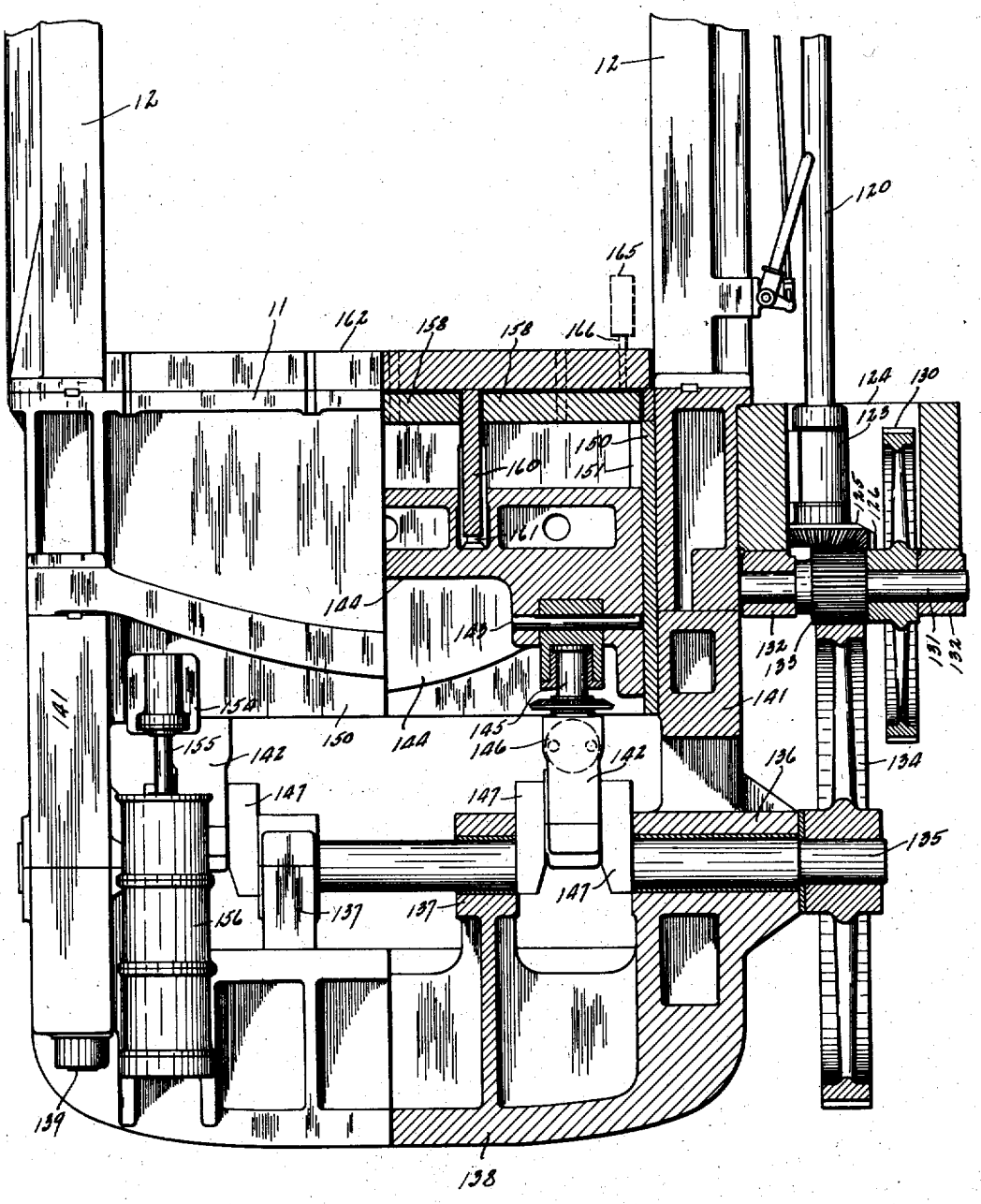
Fig. 3 is a front elevation of the press, partly in vertical section, showing the portion of the press below the press-bed.
Figure 4:
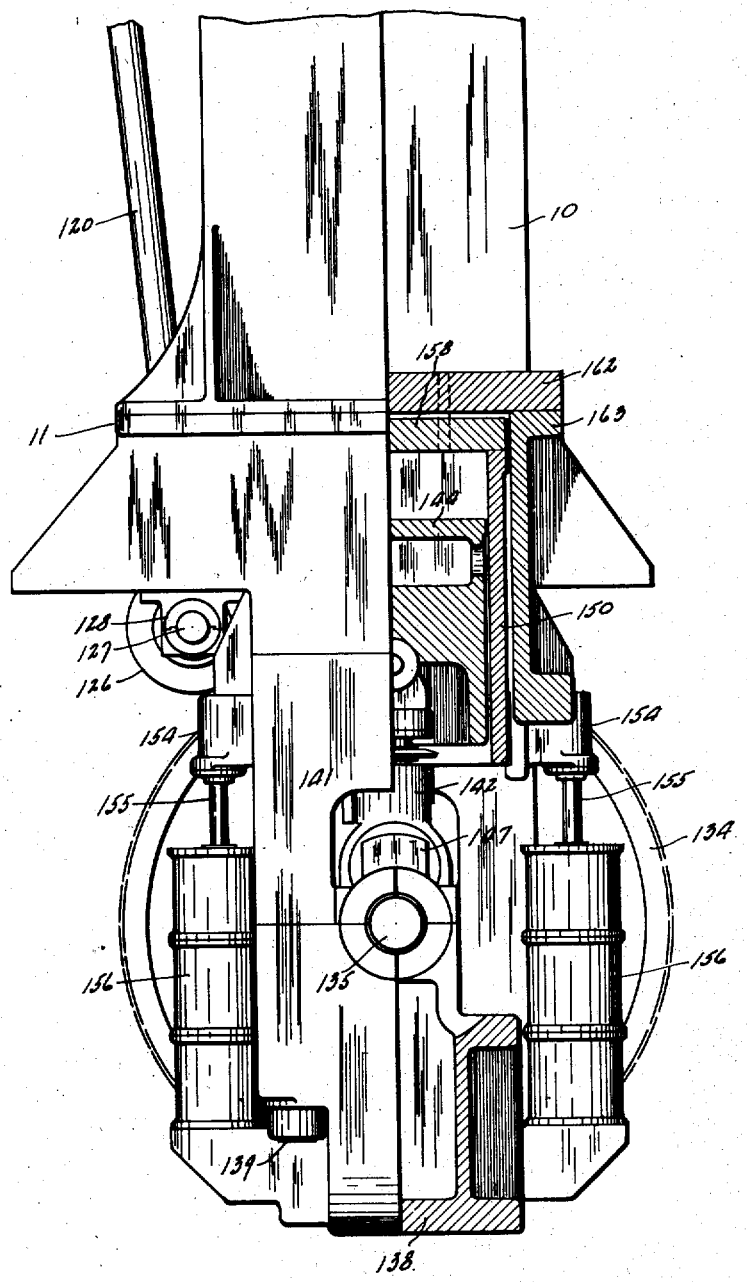
Fig. 4 is a side elevation showing the portion of the press below the press-bed partly in section.

Slidably mounted in the bed 11 of the press and suitably guided therein is a stripper slide 150 this slide being in the form of a hollow shell or box open at the lower end and guided for vertical reciprocatory motion. This slide 150 guides the plunger 144 as by means of the guide ways 151 provided in the slide 150 which extend into corresponding guide slots in the plunger. The lower portion of the stripper slide 150 is provided at its four corners with the outstanding brackets 154 each of which is fastened to the upper end of a piston-rod 155. In the positions shown in Figs. 3 and 4, the stripper slide 150 and the piston-rods 155 are at their upper limits of movement and the pistons, provided at the lower ends of the piston-rods 155, are adjacent upper portions of the four fluid cylinders 156 provided at the four corners of the bottom of the press. These four cylinders contain fluid and act as a means for permitting the cushioned downward movement of the stripper slide 150 and as a means for returning this slide upwardly after the same has been released. At the top of the stripper slide 150 are the three cross-plates 158 extending from front to rear of the press and attached at their front and rear portions to the front and rear sides of the stripper slide 150. The cross-plates 158 move between strength members 160 extending from front to rear of the press and removably supported at their ends at front and rear portions of the press-bed in a rigid manner. The top sides of these strength members 160 support the heavy bolster-plate 162 which may be rigidly attached to the press-bed, overlying the front and rear sides 163 and 164 of the press-bed. The plunger 144 is provided with forwardly and rearwardly extending recesses or slots in which the strength members 160 may be received, and the uppermost limit of movement of the plunger 144 is such as to just clear the lower sides of the beams 160. The lower ends of the beams 160 act as bumpers to limit the upward movement of the stripper slide 150, pins 161 being provided between the beams 160 and the recessed portion of the stripper slide in which the beams 160 are received.

The plunger 144 may be operably connected to a plunger die as by means of vertical pins projecting down through holes in the bolster-plate 162 and through the cross-plates 158 of the stripper slide. The plunger thus vertically reciprocates the plunger die by means of these pins just mentioned. Outside of the plunger die, a stripper plate, shown in dotted lines in Fig. 3 at 165 may be employed to engage the lower side of the work or blank and cooperate with upper slide or slides in a drawing operation or for the removal or disengagement of the work after it has been formed. This stripper plate rests on pins 166 which extend down freely through holes in the bolster plate and engage the top sides of the cross plates 158. When the blank holder 14, operated from the upper portion of the press, comes down and engages the work or blank which rests on the stripper plate, the stripper plate is moved downwardly until a bottom die, which may be rigidly held on the bolster-plate 162 is engaged with the work. During this downward movement of the stripper plate the cross-plates 158 of the stripper slide 150 force the stripper slide bodily downwardly in its guides in the bed and force the pistons in the fluid system downwardly. After the engagement of the outer blank holder 14 with the work on the bottom die the blank holder dwells in its movement and the intermediate top slide comes into action to draw or stamp the metal. Both the top plunger and the bottom plunger may be used, or if desired either one or both of these plungers need not be provided with dies and will be ineffective. The two top slide members 14 and 74 may be used at the same time or used singly with either the top plunger, the bottom plunger or both according to the character of the work. By the provision of five different slides almost any character of work and combinations of dies may be dealt with in a satisfactory manner but it is apparent that it is not necessary to use all of the slides at any one time or for any one setting of the press. The bottom plunger as shown in Fig. 11 is movable towards the work or blank at approximately the same time that the top plunger 72 moves toward the work, curve D in this figure indicating the character of the movement of the lower plunger 144. This plunger may be used to stamp a hole in the partly-formed work or may be used as a drawing slide with or without the cooperation of a die held in the top plunger 72. After the dies held by the top slide members have started their upward movement the stripper plate 165 frees the formed blank from the bottom dies and moves upwardly carrying the formed work with it.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A drawing press having a frame, three movable die-slides provided in said frame, a crank-shaft rotatable in said frame, and three distinct driven connections from said crank shaft for independently operating the three slides, the three slides all being movable to effective positions in the same direction relatively to the press.

2. A drawing press comprising a frame, a bed, and three movable die slides mounted in said frame to move in the same direction away from the bed, toggle means for moving one of said slides with a dwell in its movement, toggle means for moving a second slide with a dwell in its movement and means for moving the third slide.

3. A press having more than two movable die slide members, a bed, operating means located at one side of the bed, and connections between said means and three of said slide members, said connections being all located at the said one side of the bed.

4. A drawing press comprising a frame having a bed, a first die slide member and a second die slide member provided in said frame, a rotatable crank-shaft mounted in said frame, a crank connection from said crank-shaft direct to the first slide member, and a connection from the crank-shaft to the second slide member independent of said crank connection, a third die slide member, means for operating said third slide member with a dwell in its movement, and a power shaft operably connected to said crank-shaft and to said operating means.

5. A drawing press comprising a frame, a bed, and three movable slides mounted within the frame to move in the same direction away from the bed, toggle means for moving one of said slides with a dwell in its movement, toggle means for moving a second slide with a dwell in its movement, a power-operated crank-shaft, connection from the ends of said crank-shaft to one of said toggle means, a connection from the inner part of the shaft to the other toggle means, and an additional connection from the inner part of the shaft to the third slide.

6. In a drawing press, a frame, an outer slide member mounted in said frame for reciprocatory movement, an intermediate slide member mounted in said outer slide member for reciprocatory movement, an inner slide member mounted within the intermediate member for reciprocatory movement, and a crank-shaft rotatable in said frame and having three independent driven connections for reciprocating all of said slide members.

7. In a drawing press, a frame, an outer slide member mounted in said frame for reciprocatory movement, an intermediate slide member mounted in said outer slide member for reciprocatory movement, an inner slide member mounted within the intermediate member for reciprocatory movement, and means for reciprocating all of said slide members, said means comprising a shaft rotatably mounted in said frame, a connection from the center of said shaft to one of said slide members, a connection from inner portions of said shaft spaced from the center thereof for operating another of the slide members and a connection from the end of said shaft for operating still another of the slide members.

8. A drawing press comprising a frame, a bed and three nested slide r embers slidable to positions at one side of the bed, a crank-shaft rotatably mounted in said frame, a direct crank connection between said crank-shaft and one of said slide members, a pair of spaced rock-shafts, a toggle connection between said crank-shaft and the rock-shafts, toggle connections between the rock-shafts and one of the slide members, additional rock-shafts, connections between the crank-shaft and the additional rock-shafts, and toggle connections between the additional rock-shafts and the other slide member.

9. In a drawing press, a frame, a plunger in said frame, and two nested slide members operable with dwells in their movements, a crank-shaft rotatably mounted in said frame, a pair of rock-shafts symmetrically arranged in parallelism with the crank-shaft, driving connections between the crank-shaft and the rock-shafts, means for rotating said crank-shaft, a direct driving connection from the crank-shaft to the plunger, toggle connections between the rock-shafts and one of the slide members, additional rock-shafts symmetrically arranged in parallelism with the crank-shaft, driving connections between the crank-shaft and the additional rock-shafts, the various said driving connections being symmetrically connected to the crank-shaft, and means connecting said additional rock-shafts to the other of said slide members.

10. A drawing press comprising a frame, a bed, a crank-shaft in said frame above the bed, a plunger reciprocally mounted within said frame, a crank connection between said crank-shaft and said plunger, a second crank-shaft in the frame below the bed, a second plunger reciprocally mounted within said frame, a crank connection between the second crank-shaft and the second plunger, means for operating both of said crank-shafts, a blank holder, and means connected to one of said crank-shafts for operating said blank holder with a dwell in its movement.

11. A drawing press comprising a frame, a bed in said frame, a shaft mounted in the frame above the bed, a die slide adapted to reciprocate within said frame, an operating connection between said slide and said shaft, a second shaft rotatably mounted in said frame below the bed, a second die slide adapted to reciprocate within said frame, an operating connection between the second slide and the second shaft, a blank holder, a third die slide, operating mechanism for the blank holder, and operating mechanism for the third slide.

12. A drawing press comprising a frame, a bed, a plunger adapted to reciprocate within said frame, a crank-shaft mounted in the frame above the bed, an operating connection between the crank-shaft and the plunger, a second crank-shaft mounted in the frame below the bed, a second plunger adapted to reciprocate within said frame, an operating connection between the second plunger and the second crank-shaft, a slide member in which one of said plungers is slidably mounted, operating means including a toggle connection interconnecting said slide member and one of said crank-shafts, a second slide member adapted to reciprocate within said frame, operating mechanism including a toggle connection for driving the second slide member from one of the crank-shafts, and means for driving both of said crank-shafts.

13. In a drawing press, a frame, a rotatable crank-shaft in the top of the frame, a second rotatable crank-shaft in the bottom of the frame, a plunger adapted to reciprocate within said frame and connected to each crank-shaft, a blank holder operably interconnected to one of said crank-shafts, common driving means for both of said crank-shafts, said plungers being operable toward each other and away from each other during the inward and outward strokes of the plungers respectively.

14. In a drawing press, a stationary bed, a frame in which said bed is provided, a plurality of die slide members movable within said frame to positions above the bed, operating means therefor, an ejector member for ejecting work upwardly away from the bed, a plunger movable away from the bed in a downward direction, and operating means for said plunger.

15. In a drawing press, a frame, an ejector member slidable in said frame, a plunger slidable in said ejector member, operating means for said plunger located at one side of the vertical center of the press, and a plurality of nested slide members slidable within the frame at the opposite side of the press, and means for driving said slide members with dwells in their movements.

16. In a drawing press, a frame, two die slide members movable in the frame towards effective positions in the same direction relatively to the press, a pair of toggle shafts in the frame, a crank-shaft in the frame, operating connection between the crank-shaft and the toggle shafts, toggle connections between the toggle shafts and one of the slide members, operating shafts concentric with said toggle shafts and provided at both ends of the toggle shafts, operating means for said operating shafts, and toggle connections between said operating shafts and the other slide member.

17. In the drawing press, a frame, a pair of die slides one mounted in the frame and the other mounted in the first slide, a plunger adapted to reciprocate within said frame, a crank-shaft rotatably mounted in said frame, a connection between the plunger and the crank-shaft, a rock-shaft connected to the crank-shaft, a toggle connection between the end portions of said rock-shaft and one of said slides, operating shafts concentric with and mounted on said rock shaft, means for driving said operating shafts and a toggle connection between each of said operating shafts and the other slide.

18. In a drawing press, a frame, a plurality of nested die slides mounted for reciprocal movement in said frame, toggle systems connected to each of said slides, and operating means for said toggle systems comprising rock-shafts mounted coaxially and supported one upon another for oscillatory movement.

19. In a drawing press, a frame, a bed in the frame, a crank-shaft mounted in the frame, a plunger adapted to reciprocate within said frame, a direct connection between the plunger and the crank-shaft, a pair of spaced toggle shafts, means for operating said toggle shafts from the crank-shaft with dwells in their movements, a die slide adapted to reciprocate within said frame, toggle connections between the toggle shafts and the die slide, a second die slide, toggle links for operating said second die slide, and means for operating said toggle links said means being mounted for oscillatory movements on the toggle shafts.

20. In a drawing press, a frame, a die slide movable in said frame, a die slide movable within said first die slide, a pair of rock-shafts in said frame, toggle connections from said rock-shafts for operating one of said slides, four individual rock-shafts, a toggle connection from each of said individual rock-shafts to the other of said slides, and means for operating said rock-shafts.

21. In a drawing press, a frame, a plurality of nested die slides adapted to reciprocate within said frame, link means connected to one of said slides, operating means for said link means comprising rock-shafts journaled in said frame, a set of links connected to the other of said slides, and additional rock-shafts connected to said set of links and mounted in alignment with said first named rock-shafts.

22. In a drawing press, a frame, a stationary bed associated with said frame, a drawing slide movable downwardly towards the bed, a stripper slide mounted in said frame and adapted to support a blank, means for yieldingly supporting said stripper slide, a die slide slidingly mounted adjacent said stripper slide and movable upwardly toward the blank position, and mechanical means for positively operating said die slide.

23. In a press of the class described, a frame, a press bed in said frame, a die slide movable in said frame, toggle links connected to said slide for operating it with a dwell in its movements, a second die slide, toggle links connected to said second slide for operating it with a dwell in its movements independently of the first slide, and a drive means for operating all of said toggle links.

24. In a drawing press of the class described, a frame, a press bed in said frame, a die slide movable in said frame, toggle links connected to said slide for operating it with a dwell in its movements, a second die slide slidably mounted within said first named slide, toggle links connected to said second slide for operating it with a dwell in its movements independently of the first slide, and drive means for said toggle links.

25. In a drawing press of the class described, a frame, a press bed in said frame, a die slide movable in one direction in said frame, toggle links connected to said slide for operating it with a dwell in its movements, a second die slide slidably mounted within said first named slide and operable in the same direction, toggle links connected to said second slide for operating it with a dwell in its movements independently of the first slide, a die slide mounted in said frame for reciprocatory movement in a direction counter to that of said first two slides, and drive means for said toggle links and for said third die slide.

26. In a drawing press of the class described, a frame, a press bed in said frame, a die slide movable in one direction in said frame, toggle links connected to said slide for operating it with a dwell in its movements, a second die slide slidably mounted within said first named slide and operable in the same direction, toggle links connected to said second slide for operating it with a dwell in its movements independently of the first slide but with a conjoint period of dwell for said two slides, a die slide mounted in said frame for reciprocatory movement in a direction counter to that of said first two slides, and drive means for effecting sequence operation of said several toggle links and connected slides and said third die slide whereby said third die slide performs its drawing movement within said period of conjoint dwell.

27. In a drawing press of the class described, a frame, a press bed in said frame, a die slide movable in one direction in said frame, means connected to said slide for operating it with a dwell in its movements, said means including toggle links, a second die slide slidably mounted within said first named slide and operable in the same direction, means connected to said second slide for operating it with a dwell in its movements independently of the first slide but with a conjoint period of dwell for said two slides, said means including toggle links, a third die slide mounted in said frame for reciprocatory movement in the direction counter to that of said first two slides, and means for effecting operation of said several die slides in timed relation whereby said third die slide performs its drawing movement within said period of conjoint dwell.

28. In a drawing press of the class described, a frame, a press bed in said frame, a die slide movable downwardly in said frame towards said bed, means including toggle links connected adjacent the four corners of said slide for operating it with a dwell in its movements so that said slide acts as a blank holder, a second die slide slidably mounted within and movable in the same direction as said first named slide, means including toggle links connected adjacent the four corners of said second slide and operating it to draw in said first named direction and then with a dwell in its movements independently of the first slide to act as a second blank holder, a third die slide slidable in said press bed and operable in a direction counter to that of said first two slides for effecting a drawing operation in said opposite direction, means for operating said third die slide in said opposite drawing operation and drive means for said several toggle links and for said third die slide operating means for operating the same in timed relation with respect to each other.

29. In a drawing press of the character described, a frame, a press bed in said frame, a die slide movable in the upper part of said frame, a second die slide slidably mounted within said first named slide, a third die slide mounted in the lower part of said frame for movement in a direction counter to the movement of said upper die slides, a pair of operating members symmetrically arranged in parallelism within the upper part of said frame, means connecting said operating members to said nested die slides and including toggle links, for effecting operation of said first and second die slides each with a dwell in its movements independently of the other, an operating member within the lower part of said frame, means for connecting said operating member to the die slide in the lower part of said frame for effecting movement thereof in a direction counter to the movement of the upper slides and in timed sequence with respect thereto, whereby said lower die slide effects a drawing operation during a period of conjoint dwell of the upper die slides, and means for causing operating movement of the several operating members.

30. In a drawing press of the character described, a frame, a press bed in said frame, a die slide movable in the upper part of said frame, a second die slide slidably mounted within said first named slide, a third die slide mounted in the lower part of said frame for movement in a direction counter to the movement of said upper die slides, operating members symmetrically arranged in parallelism within the upper part of said frame, means connecting said operating members to said nested die slides and including toggle links, for effecting operation of said nested die slides each with a dwell in its movements independently of the other, operating means within the lower part of said frame, means for connecting said operating means to the die slide in the lower part of said frame for effecting movement thereof in a direction counter to the movement of the upper slides and in timed sequence with respect thereto, whereby said lower die slide effects a drawing operation during a period of conjoint dwell of the upper die slides, driving means for said pair of operating shafts, and driving interconnection therefrom to said lower operating means.

31. In a drawing press of the character described, a frame, a bed in said frame, operating members mounted in the frame above said bed and including toggle links, a die slide adapted to reciprocate within said frame, operating connection between said slide and said toggle links, a second operating member mounted within said frame below the bed, a second die slide adapted to reciprocate within said frame in a direction counter to the movement of said first named slide, said second die slide being operatively connected to said second operating member for efnecting a drawing operation, other operating members mounted within the upper portion of said frame and including toggle links, and a third slide slidably mounted within said first named slide and operatively connected to the toggle links of said last named operating members for reciprocation with independent dwell in the same direction as said first named slide and means for effecting operation of said several slides in timed sequence, whereby the second slide effects a drawing operation while said first and third slides dwell.

32. In a drawing press of the class described, a frame, a press bed in said frame, a plurality of nested die slides adapted to reciprocate within said frame and one slidably mounted within the other, a set of toggle links connected to one of said slides, operating means for said links comprising rock members supported in said frame and journaled for oscillatory rocking movements and having projecting arm portions pivotally connected to said links, a second set of toggle links connected to the other of said slides, additional rock members having projecting arm portions pivotally connected to said last mentioned toggle links and mounted in alignment with said first named rock members, a third die slide mounted in said bed for reciprocatory movement and operable in a direction counter to both of said nested die slides, and means for operating said toggle operated slides and third die slide in timed relation, and said toggle operated slides each with a dwell in its movements independently of the other.

33. In a drawing press of the character described, a frame, a press bed in said frame, three nested slides movably mounted within the upper part of said frame and one slidably mounted within the other, a die slide mounted in the lower part of said frame for movement in a direction counter to the movement of said upper die slides, operating members arranged within the upper part of said frame, means connecting said operating members to two of said nested die slides and including toggle links, for effecting operation of said nested die slides with independent dwells in their movements, means connecting the other of said upper slides to said operating members for effecting operation in timed sequence with said toggle operated slides, an operating member within the lower part of said frame, means for connecting said lower operating member to the die slide in the lower part of said frame for effecting movement thereof in a direction counter to the movement of the upper slides and in timed sequence with respect thereto, whereby said lower die slide effects a drawing operation during a period of conjoint dwell of the toggle operated upper slides, and means for causing operating movement of the several operating members.

34. In a drawing press of the class described, a frame, a press bed in said frame, a die slide movable in one direction in said frame, toggle links connected to said slide for operating it with a dwell in its movements, a second die slide slidably mounted within said first named slide and operable in the same direction, toggle links connected to said second slide for operating it with a dwell in its movements independently of the first slide, a third die slide mounted in said frame for reciprocatory movement in the same direction as said toggle operated slides, a die slide mounted in said frame for reciprocatory movement in a direction counter to that of said first three slides, and drive means for said toggle links and for said other two die slides.

ARTHUR A. BYERLEIN.